United States Patent

King et al.

[15] 3,677,406
[45] July 18, 1972

[54] FILTER AID SLURRY METERING PROCESS

[72] Inventors: James A. King; David R. Maxam, both of Green River, Wyo.

[73] Assignee: Stauffer Chemical Company, New York, N.Y.

[22] Filed: Sept. 25, 1970

[21] Appl. No.: 75,587

[52] U.S. Cl....................................210/75, 210/96, 210/193
[51] Int. Cl............................................................B01d 37/02
[58] Field of Search.......................................210/75, 96, 193

[56] References Cited

UNITED STATES PATENTS 3,349,913  10/1967  Schneider............................210/96 X
3,362,533  1/1968  Muller...................................210/75

Primary Examiner—Jim L. DeCesare
Attorney—Daniel C. Block, Edwin H. Baker, Albert J. Adamcik and Harry A. Pacini

[57] ABSTRACT

A system for measuring the solids content on a dry basis in a filter aid water slurry and pumping the filter aid back into a filter is described herein. The system circulates the filter aid water slurry through a density gauge and flowmeter to measure the dry weight of solids therein. Then, the slurry is pumped back into the filter for reuse.

3 Claims, 1 Drawing Figure

Patented July 18, 1972

3,677,406

INVENTOR.
JAMES A. KING
DAVID R. MAXAM
BY
Daniel C. Bloch
ATTORNEY

3,677,406

FILTER AID SLURRY METERING PROCESS

BACKGROUND OF THE INVENTION

In the art of extracting soda ash from Wyoming Trona, it is the practice to heat the crude trona in a calciner and convert the trona to sodium carbonate. The calcined sodium carbonate is then dissolved in a dissolver. The dissolver contains insolubles in addition to the sodium carbonate in solution. The material from the dissolver is transferred to a rake classifier where substantially all of the insolubles are removed. The solution coming from the rake classifier is conveyed to a thickener, wherein additional solids that were not removed in the rake classifier are removed. The overflow from the thickener will contain a small amount of insolubles that must be removed. The overflow from the thickener is conveyed to a leaf pressure-type filter, wherein the insolubles are removed. The leaf pressure-type filter uses as a filter aid, diatomaceous earth or perlite.

When the pressure drop across the leaf pressure-type filter becomes too great, it becomes necessary to recharge the filter with new diatomaceous earth or perlite. Thus, the insolubles and filter aid were usually dumped and the new filter aid was inserted into the leaf pressure-type filter. This resulted in substantial loss of the filter aid material, since the filter aid and insolubles could not heretofore be separated. However, a commercial separation apparatus has now been perfected which will separate the insolubles from the filter aid medium. The filter aid can now be reclaimed for additional use. Thus, the underflow from the separation apparatus will be a water slurry of the filter aid medium. In order to reuse the filter aid, it becomes necessary to manually measure the density of the slurry and then calculate the content thereof of the filter aid on a dry basis. Once the calculation has been made the slurry can be metered out by volume back into the system for reuse of the filter aid medium. As is apparent, the manual measurement of the density and the calculation of the amount of filter aid within the filter aid water slurry is subject to error and is a time-consuming operation.

BRIEF DESCRIPTION OF THE INVENTION

It has been discovered that a metering system can be readily employed and used to automatically measure the filter aid contents of the filter aid water slurry on a dry basis and pumped or metered back into the system automatically, which substantially eliminates the error and time-consuming manual operation. This is brought about by synchronizing a magnetic flowmeter with a density gauge in a unique manner, such that the signal from the two meters are read out on a totalizing meter in a distribution system. The filter aid slurry is accurately determined on a dry basis; that is to say, the number of pounds per unit volume within the slurry is accurately measured and pumped back into the system for reuse.

BRIEF DESCRIPTION OF THE DRAWING

FIG. I is a schematic illustration embodying the principles of the present invention.

DETAILED DESCRIPTION OF THE INVENTION

Figure 1:
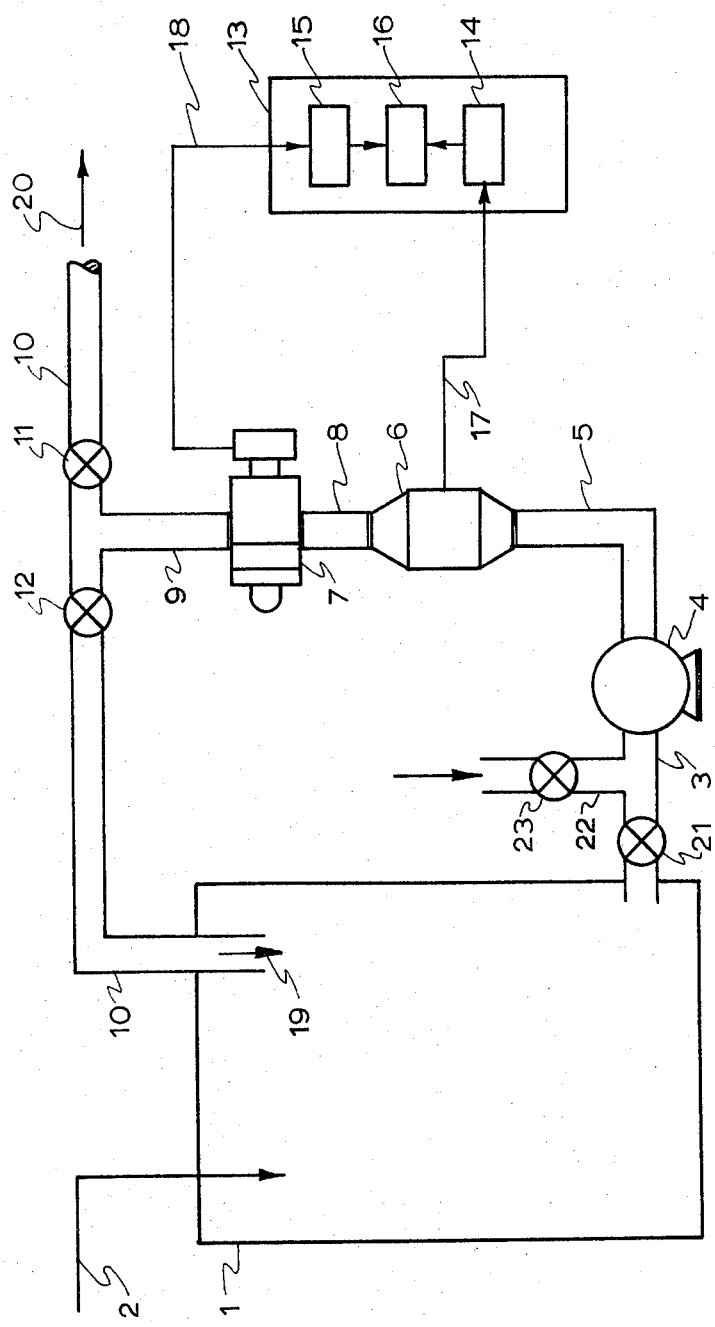

In the practice of the present invention, the filter aid slurry that has been reclaimed for reuse is conveyed to a storage or holding tank 1 via conduit 2. At the bottom portion of tank 1, conduit 3 fluidly communicates therewith and is connected to the inlet of pump 4. Fluids flowing through conduit 3 is controlled by valve 21. Intermediate the pump 4 and tank 1 conduit 22 fluidly communicates with conduit 3 with the flow of fluids therethrough being controlled by valve 23. The purpose of conduit 23 will be set forth hereinafter. The outlet from pump 4 is connected to a magnetic flowmeter 6 by conduit 5. Flowmeter 6 is connected to an automatic density gauge 7 by conduit 8. The gauge 7 is connected to a branched pipe 10 by conduit 9. One branch of conduit 10 fluidly communicates with the tank 1 with the flow of fluids therethrough being controlled by valve 12. The other branch of conduit 10 is connected to a filter aid mixing tank with the flow of fluids therethrough being controlled by valve 11.

The gauge 7 functions to measure the density by absorption of gamma radiation. The absorption of gamma radiation depends on the thickness and density of the process material, thickness and density of the process conduit, thickness and density of insulation on the conduit, and energy of the gamma radiation. Since all of these factors, except density of the process material remain constant, the gauge measures the density of the process material. The radiation source and detector are arranged so that the radiation is directed along the axis of a straight section of conduit. The radiation is provided by a gamma source. The detector is a temperature regulated ionization cell. The density gauge is mounted so that the radiation passes through the diameter of the pipe. Mounting brackets are provided so that the gauge can be coupled onto an existing conduit. The ionization cell, when exposed to gamma radiation, generates a current which can be measured. Thus, line 18 connects the ionization cell of gauge 7 with an amplifier 15. The current generated is fed into a totalizer 16. It should be noted that the gauge 7 is commercially available and is sold by Ohmart Company of Cincinnati, Ohio.

The magnetic flowmeter 6 consists of a low transmitter connected by cable 17 to the receiver 14. The flow transmitter consists of a non-magnetic tube through which the liquid flows, an electrical insulating liner on the inside of the tube, and an electro magnet which induces a magnetic field through the tube and two magnetic electrodes which are essentially flush with the inside surface of the tube and which contact the following liquid. The output of the transmitter is linear and is directly proportional to the average velocity of the flowing liquid which is, in turn, proportional to volume flow rate. It will operate accurately in any position so long as the line is completely filled. The output of flowmeter 6 is conveyed by cable 17 to the receiver 14 which is conveyed to the totalizer 16. The totalizer 16 integrates the signals from the amplifier 15 and receiver 14 to a useable digital readout. This digital reading is approximately the actual weight of the filter aid material on a dry basis necessary to recharge a filter for a production cycle. The magnetic flowmeter 6 and the receiver 14 are commercially available and sold by the Foxboro Company of Foxboro, Mass. The totalizer 16 is also commercially available and sold by Leeds & Northrup of Pennsylvania.

In operation, the filter aid water slurry is conveyed to the tank 1 via pipe 2. The percent solids in this tank may vary from about 8 to 20 percent by weight. When it is desired to recharge the leaf type filter, the pump 4 is started and valves 12 and 21 are opened. This allows the slurry to circulate through the gauge 7 and flowmeter 6 and back into the tank 1 as indicated by arrow 19 until such time as the density gauge 7 can level out. When the density gauge 7 reads a constant value, valve 12 is closed and valve 11 is opened, which will convey the slurry to the filter aid mixing tanks, as indicated by the arrow 20. The integrated circuit in the totalizer 16 receives signals from the density gauge 7 and magnetic flowmeter 6. This circuit totalizes the number of pounds of filter aid on a dry basis flowing to the mix tank. The system senses any change in density and/or flow and will automatically make adjustments for any variation of these parameters. The number of pounds of filter aid are totalized on a counter located on totalizer 16. When the required amount of filter aid has been pumped, the pump 4 is stopped and valves 21 and 11 are closed. The valve 12 is opened and water is pumped through line 22 with valve 23 being opened for a short period of time to induce flushing water. After the lines have been sufficiently flushed, the conduit 3, 5, 8 and 9 are left packed with water. This is necessary to keep the gauge 7 and meter 6 in good operating condition.

As can be seen from the above description, a system is provided which automatically measures the filter aid contents of a filter aid water slurry on a dry basis and meters and pumps the slurry back into the system automatically. It is essential to the practice of this invention that the density gauge 7 and flowmeter 6 work in unison within the circuit to provide the result achieved herein.

We claim

1. In a process for using filter aid in a filter aid water slurry, comprising the steps of:
   a. delivering the filter aid water slurry from a reclaim process to a holding means;
   b. circulating the filter aid water slurry from the holding means through a flowmeter and density gauge and back to the holding means;
   c. measuring the solids content of the slurry on a dry weight basis;
   d. totalizing the solids content of said slurry;
   e. delivering the metered slurry to a system for reuse.

2. The process as set forth in claim 1 wherein the totalizing is brought about by synchronizing the flowmeter and density gauge.

3. The process as set forth in claim 1 together with the additional step of packing the flowmeter and density gauge with water after use.

* * * * *